United States Patent [19]

Wirtz

[11] 4,276,793

[45] Jul. 7, 1981

[54] METHOD AND APPARATUS FOR TRUING A METAL WHEEL, ESPECIALLY OF A RAILROAD LOCOMOTIVE OR OTHER ROLLING STOCK

[76] Inventor: Arthur T. Wirtz, 105 Sharon Dr., Pittsburgh, Pa. 15221

[21] Appl. No.: 54,803

[22] Filed: Jul. 5, 1979

[51] Int. Cl.³ .................... B23B 3/00; B23B 5/28
[52] U.S. Cl. ............................. 82/1 C; 82/8
[58] Field of Search ........................ 82/1 C, 8

[56] References Cited

U.S. PATENT DOCUMENTS

| | | | |
|---|---|---|---|
| 2,316,058 | 4/1943 | Flygare et al. | 51/104 |
| 2,546,225 | 3/1951 | Julian et al. | 51/104 |
| 2,578,250 | 12/1951 | Jones | 51/104 |
| 2,605,591 | 8/1952 | Hill | 51/104 |
| 2,622,374 | 12/1952 | Stanley | 82/8 |
| 2,622,378 | 12/1952 | Stanley et al. | 82/8 |
| 2,626,492 | 1/1953 | Balsiger | 51/236 |
| 2,645,003 | 7/1953 | Thompson et al. | |
| 2,677,307 | 4/1954 | Bloss | |
| 2,727,343 | 12/1955 | Cisco | 51/236 |
| 2,762,171 | 9/1956 | Schmidt | 51/104 |
| 2,781,615 | 2/1957 | McLean, Jr. | 51/104 |
| 2,823,493 | 2/1958 | Stanley | 51/104 |
| 3,018,588 | 1/1962 | Long | 51/104 |
| 3,044,368 | 7/1962 | Bloss | |
| 3,174,402 | 3/1965 | Cisco | |
| 3,203,286 | 8/1965 | Dombrowski | 82/8 |
| 3,345,890 | 10/1967 | Dombrowski | 82/8 |
| 3,372,517 | 3/1968 | Sakabe et al. | 51/165 |
| 3,455,065 | 7/1969 | Shiomi et al. | 51/104 |
| 3,473,270 | 10/1969 | Byrnes et al. | 51/147 |
| 3,540,164 | 11/1970 | Deceuster | 51/236 |
| 3,593,461 | 7/1971 | Gay | 51/104 |
| 3,598,017 | 8/1971 | Saari | 82/8 |
| 3,839,932 | 10/1974 | Dombrowski | 82/8 |
| 3,848,513 | 11/1974 | Manyek | 51/104 |

FOREIGN PATENT DOCUMENTS

| | | | |
|---|---|---|---|
| 759913 | 10/1956 | United Kingdom | 82/8 |
| 1005764 | 9/1965 | United Kingdom | 82/8 |
| 1207526 | 10/1970 | United Kingdom | 82/8 |

OTHER PUBLICATIONS

Master Production Slides (Catalog HPS-72) 16 pp. from Master Machine Tools Co.

Primary Examiner—Harrison L. Hinson
Attorney, Agent, or Firm—Carothers and Carothers

[57] ABSTRACT

Method and apparatus for truing metal wheels of railroad locomotives and other rolling stock without removal of the wheels uses automatically controlled mechanism carrying a cutting tool and disposed in an open pit below the wheels which are lifted from removable rail sections for the truing operation. In preferred embodiments of the invention, the wheel to be trued is independently driven and the cutting tool is mounted on a powered cross slide which is controlled by a conventional tracer control unit which causes the cutting tool to remove metal from the wheel to form a wheel contour corresponding to a preestablished pattern.

14 Claims, 6 Drawing Figures

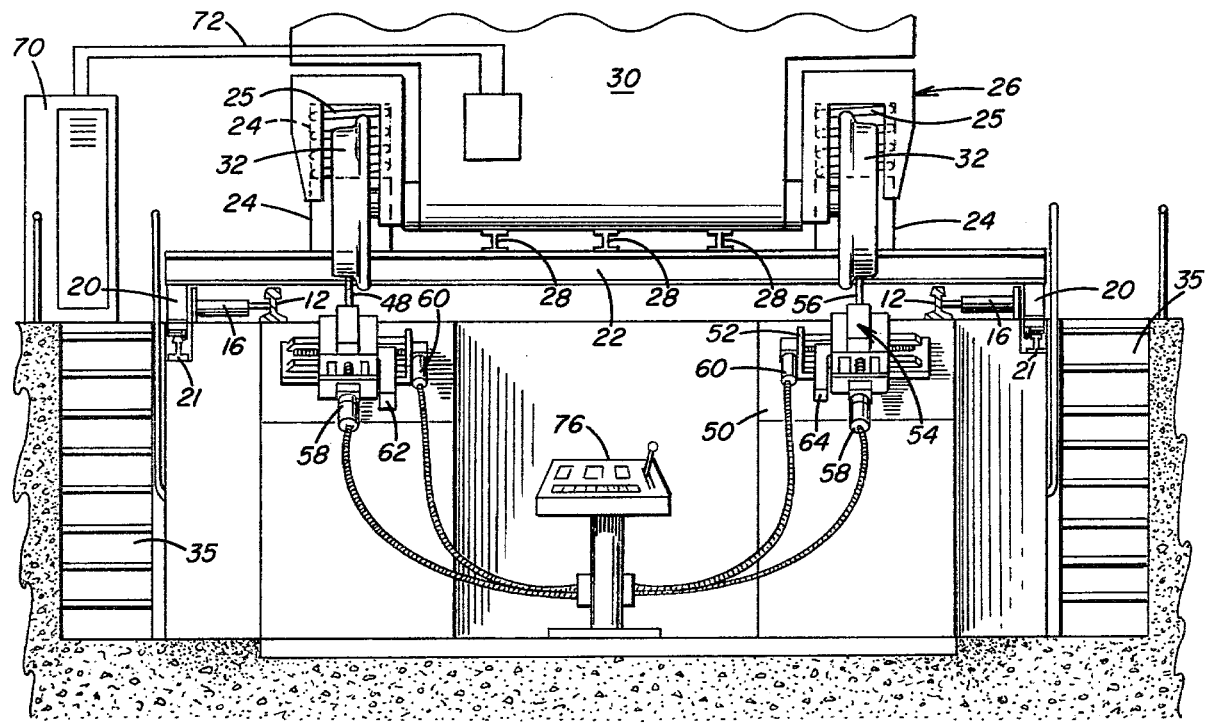
FIG. 4
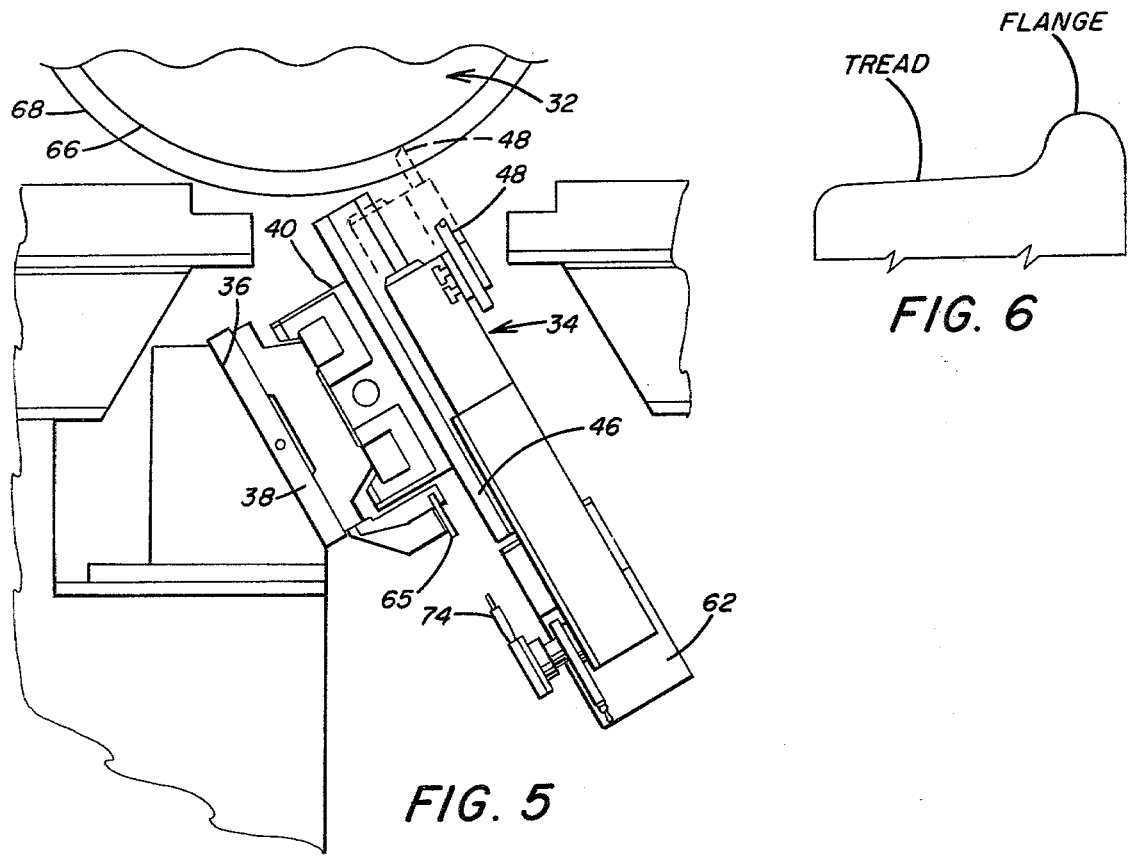
FIG. 5
FIG. 6

METHOD AND APPARATUS FOR TRUING A METAL WHEEL, ESPECIALLY OF A RAILROAD LOCOMOTIVE OR OTHER ROLLING STOCK

BACKGROUND OF THE INVENTION

1. Field of the Invention

This invention relates to method and apparatus for truing metal wheels, especially metal wheels of a railroad locomotive and other rolling stock without removing the wheels from the locomotive or stock. The invention is particularly directed to the truing of diesel locomotive wheels to bring them into compliance with specifications established by the American Association of Railroads and the following specification is addressed to that application in detail.

2. Description of the Prior Art

For many, many years one of the major problems in the operation of railroad rolling stock has been the maintenance of the metal wheels in proper condition. The abuse and wear to which the wheels are subjected adversely change the contour of the wheels, forming so-called "flats", "high flanges" and other unacceptable wheel contours. Other ordinary wheel contour defects resulting from service include wheels having a thin flange, a vertical flange, or worn tread. As one example of a problem arising from a defective wheel, a wheel with a high flange may strike and severely damage a railroad switch as it passes over it.

To date, there have been a few satisfactory methods and machines for truing metal wheels of locomotives and the like to provide a consistent and accurate contour as suggested by the American Association of Railroads (A.A.R.), but these required additional work and expense, for example, they required removal of the brake rigging, sand spouts and the like. In fact, the A.A.R. specification itself for Wheel Lathe Practice, Section 2D, for truing locomotive wheels is far from specific regarding the method to be used in truing wheels, satisfying itself with directions for the most economical and workmanlike method. However, Section 2D of the A.A.R. specification is quite specific in regard to the proper railroad wheel contours for operation and these may be achieved consistently with the method and apparatus of the present invention.

The patented art does suggest various methods and apparatus for truing locomotive and car wheels; some of these patents disclose ways and means to do so without removing the wheels from the locomotive or car, as in U.S. Pat. Nos. 2,622,374; 2,622,378; 2,677,307; 2,727,343; 2,762,171; 2,823,493 and 3,540,164. U.S. Pat. No. 2,578,250 specifically discloses grinding apparatus for use with diesel locomotive wheels which are driven by separate power means supplied to the wheel traction motors.

Various U.S. patents disclose truing mechanisms disposed in a pit beneath removable track sections; for example, such mechanisms are shown in U.S. Pat. Nos. 2,622,374; 2,622,378; 2,677,307 and 2,762,171. The latter patent specifically describes the use of horizontally or transversely movable track sections. Jacking devices for lifting a locomotive or car from said sections are also disclosed in U.S. Pat. No. 2,677,307 as well as in U.S. Pat. No. 3,473,270.

SUMMARY OF THE INVENTION

The present invention is an improvement in a method of truing metal wheels, especially wheels of railroad locomotives and other rolling stock, wherein the locomotive or other rolling stock is moved into position on rail sections extending over an open pit. The locomotive or other rolling stock is then lifted from the rail sections and the rail sections are moved, preferably transversely, to provide access to the wheels from the pit. The improvement in the method comprises the steps of providing an independent power source for driving the wheel to be trued; providing in the pit mechanism including a cutting tool for removing metal from the wheel; and controlling the mechanism in accordance with a predetermined pattern to cause the cutting tool to move across the wheel to remove metal to form a wheel contour corresponding to said pattern.

The improved apparatus in accordance with the invention includes means for lifting the locomotive or other rolling stock from the rails and means for removing the rail sections from beneath the rails to provide access to the wheels from the open pit beneath the wheels. The apparatus also includes means for driving a wheel to be trued independently of the usual means for driving the locomotive or stock. Means are provided for cutting metal from the wheels and for controlling the cutting means to cut the metal in a contour corresponding to a predetermined pattern.

A preferred mechanism for removing the metal from the wheels to be trued includes cutting means engageable with a metal wheel. The mechanism includes a cutting tool having means for supporting it such that it is movable into engagement with the wheel and across its contour. The supporting means comprises a base, a saddle movably mounted on the base and a cross slide carrying the cutting tool and movably mounted on and at right angles to the saddle. Means, preferably in the form of a tracer control unit, are provided for controlling the movement of the cross slide in accordance with a predetermined pattern to cause the cutting tool carried by the cross slide to remove metal from the wheel to establish a contour corresponding to said pattern.

Although it is not necessary, the end caps of the axles may be removed to expose the ends of the axles so that the precise center locations for the axles can be ascertained and used for the truing operation.

The invention provides the advantages of maintaining wheels of locomotives and other rolling stock without removing them, thereby reducing labor time and expense; improving the accuracy and consistency of the truing operation, assuring compliance with the standards of the A.A.R.; and utilizing minimum power requirements for the truing operation.

These and other advantages of the present invention over prior methods and apparatus described and used in the art for truing metal wheels for railroad locomotives and other rolling stock will become evident upon consideration of the following description taken with the accompanying drawings.

BRIEF DESCRIPTION OF THE DRAWINGS

In the drawings:

FIG. 4 is an enlarged sectional view taken along lines IV—IV of FIG. 2;

FIG. 5 is a side view of the left-hand truing apparatus as the apparatus is viewed in FIG. 4; and FIG. 6 is a representative tread and flange contour for narrow flange steel wheels on cars, tenders, diesel and electric locomotives, trailer and engine track wheels established by the A.A.R.

DETAILED DESCRIPTION OF PREFERRED EMBODIMENTS OF THE INVENTION

Figure 1:
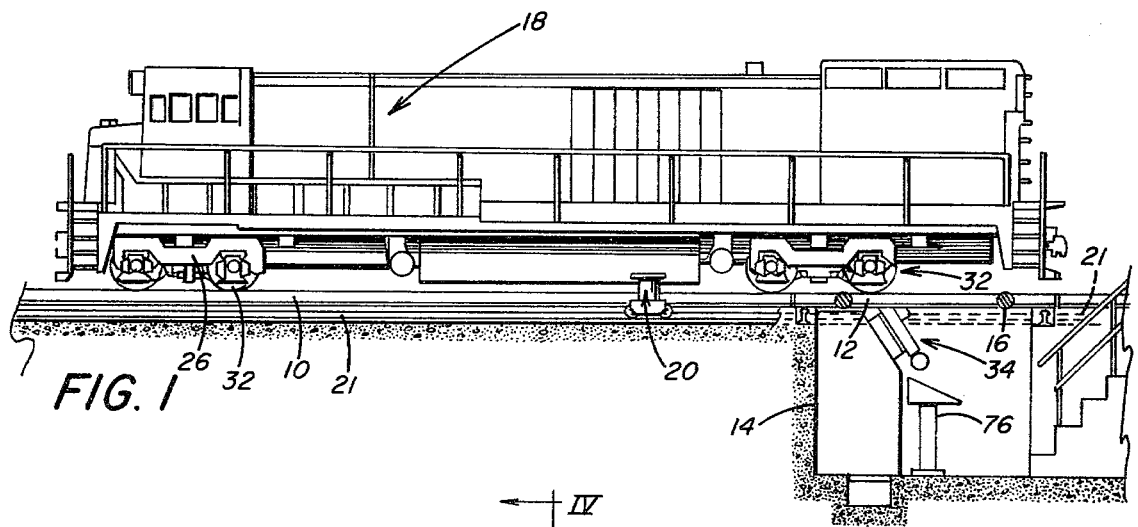
FIG. 1 is an elevation view of a railroad locomotive positioned over a pit in which truing apparatus according to the invention is disposed.
Figure 2:
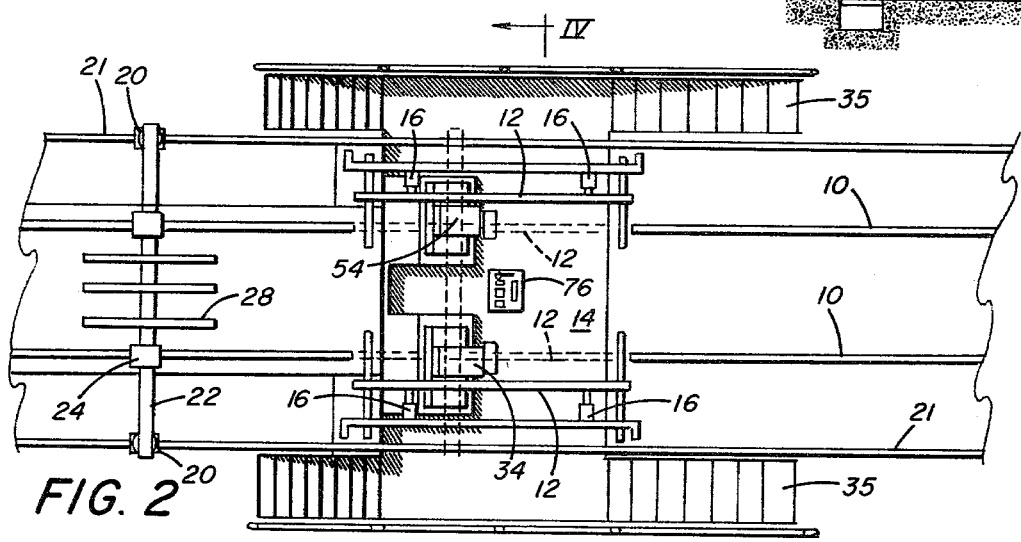
FIG. 2 is a partial plan view of the pit and truing apparatus.

Referring to FIGS. 1 and 2, a pair of standard gauge railroad rails 10 having removable rail sections 12 extend across the top of an open pit 14. The sections 12 are adpated to be moved outward transversely, for example by pistons 16, from the position shown in dashed lines to that shown in solid lines in FIG. 2. Wheel truing apparatus disposed within and adjacent the pit 14 includes means for lifting a railroad locomotive 18 comprising a pair of hydraulic jacks 20 mounted on wheeled carriages movable along rails 21 and spaced on opposite sides of rails 10. A beam 22 (see FIG. 3), supported by and adapted to be raised and lowered by the jacks, extends transversely of rails 10.

A block 24 at each end of beam 22 is adapted to contact the bottom of a leaf spring 24 in a channel of a locomotive truck 26. Transverse beams 28, which are approximately 2½ inches lower in lifting height than blocks 24, will contact the housings of the locomotive traction motors 30, to raise the entire assembly when the jacks 20 are operated.

Conventional jacks and lifting beams may be used. When a locomotive is positioned over the beam, the jacks may be raised to lift it above the rail sections 12 to permit them to be moved outboard of the rails 10 to provide access to wheels 32 mounted in truck 26 from pit 14.

The wheel truing apparatus also includes truing mechanism 34 which is disposed in the pit 14, access to which is obtained by stairs 35. The mechanism, as shown more particularly in FIGS. 3 and 4, comprises a device including a support 36; a first supporting base 38; a first saddle 40; a second supporting base 42; and a second saddle 44 forming a cross slide 46. A cutting tool 48, which is preferably a lathe cutting tool, is positioned on the cross slide 46 for movement in the X and Y axes. An identical device comprising a supporting base 50 with saddle 52, and a cross slide 54 carrying cutting tool 56, except of opposite hand, is located under the opposed rail sections 12. Each unit is powered by a variable speed motor 58, 60 and controlled automatically by a conventional tracer control unit 62, 64.

Figure 3:
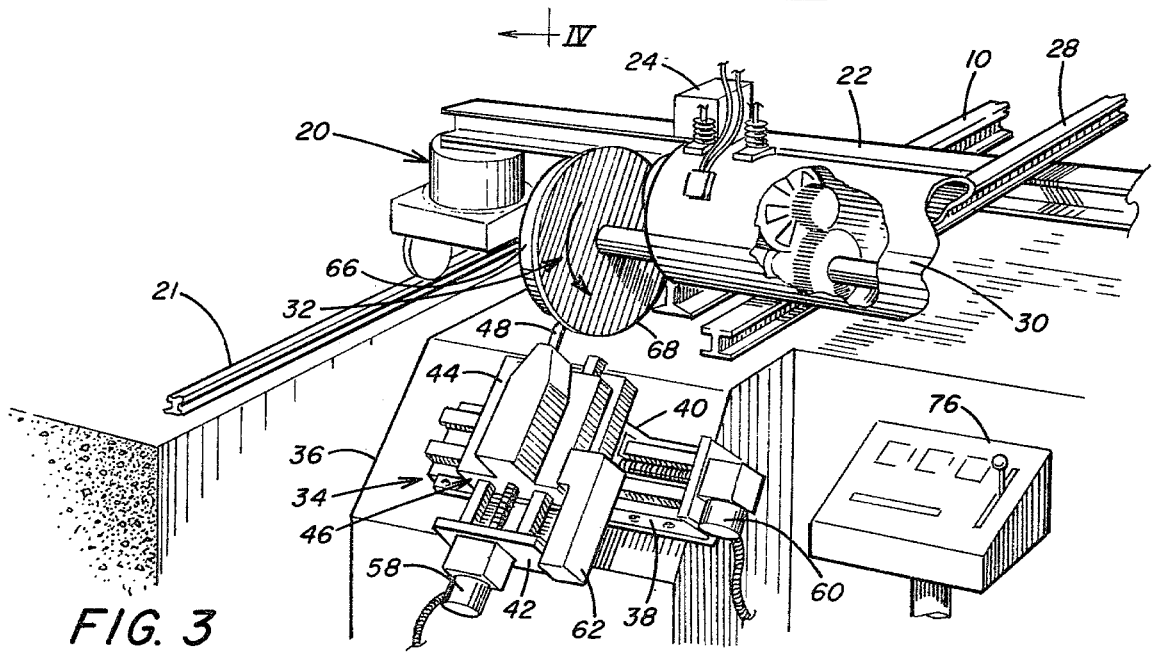
FIG. 3 is an enlarged partial perspective view of the truing apparatus.

As shown in the enlargement of FIG. 3, the truing mechanism is disposed and oriented in the pit 14 such that the cutting tool 48 (and tool 56 of the device shown in FIG. 4) extends at an angle of approximately 30° to the vertical axis of wheels 32. An approach and engagement angle of 30° between the tool and the wheel surface is preferable, although not critical, since it permits the tool 48 to be advanced into engagement with the wheel tread 66 and flange 68 without interference with any part of the locomotive rigging, i.e. the sand spouts and brake rigging (not shown).

An independent power source 70, including for example a silicon-controlled rectifier for connection by cable 72 to the locomotive traction motors 30, is provided for driving the wheels 32 during the truing operation. Preferably, the power source should be capable of providing a stable drive to the cutting tool under load at variable speeds to accommodate wheel rotation speeds of between about 5 and 40 rpm.

The tracer control units 62, 64 per se are conventional units. Preferably, an electronic unit identified as a "Precision Contour Tracer" Model PCB is used. The "Precision Contour Tracer" (see FIG. 5) is mounted on a cross slide 46, 54 and controls the movement of the cross slide with respect to the saddle 40, 52 in accordance with a selected template 65 having a preestablished pattern corresponding to the desired contour of the trued wheel. A stylus 74 for following the template 65 is mounted on the cross slide 46, such that as the stylus follows the template, the tracer control unit which includes a servomechanism connected to the feed screw of the cross slide saddle causes the cross slide to move in and out with respect to the surface of the wheel.

A console 76 is provided from which the operator can control the truing apparatus automatically. The console is preferably located in the pit 14 below and between the wheels to be trued so that the operator can visually observe the truing operation on both wheels of the same axle.

In the preferred method of truing the wheels 32, the locomotive 18 is advanced on rails 10 and positioned such that the wheels to be trued are located on removable rail sections 12. Jacks 20 are then moved into position under truck 26 and actuated raising beams 22 and 28 against the traction motors 30 and the locomotive undercarriage, thereby lifting wheels 32 above rail sections 12, preferably approximately one inch. The rail sections are then moved transversely by pistons 16 to provide access to the tread and flange surfaces of the wheels to be trued by the cutting tools of the truing mechanism 34.

The traction motors 30 are disconnected from the locomotive generator and reconnected to the power source 70 to drive the wheels 32 independently.

A template having an appropriate predetermined pattern is selected and inserted in the tracer control unit 62, 64. The selection is dictated by the fact that the pattern must produce, under control of the tracer control unit, a wheel contour formed by the cutting tool corresponding to the contour according to the standards established by the A.A.R. or other recognized standard-setting organization. For example, the A.A.R. established contour for narrow flange steel wheels on cars, tenders, diesel and electric locomotives, trailer and engine truck wheels is shown in FIG. 6. Based upon that established standard for the type wheel involved, the selected template must produce an actual wheel contour formed by the cutting tool 48 corresponding to the contour shown in FIG. 6. In other words, the template selected for use has the same pattern as the contour shown in FIG. 6 and it is followed by the stylus which forms a part of the automatic tracer control unit.

After the tracer control unit 62 is ready, the cutting tool 48, for example (as shown in solid lines in FIG. 5), is advanced by an operator, using the cross slide, to position the cutting tool 48 (as shown in dotted lines in FIG. 5) with a reference point on one wheel 32. The operator then aligns the stylus 74 of the tracer control unit 62 in the same relationship with the template 65 by moving the adjusting compound in the horizontal direction. When this alignment is completed, the operator causes the cutting tool to touch the surface of the wheel, retracts the tool to clear the surface of the wheel and moves the cross slide in the vertical plane to establish the depth of cut, usually on the order of approximately ⅛ inch, to be made. The cutting tool 48 is then fed across the wheel surface under the control of the tracer control unit 62 to produce an accurate and precise wheel contour corresponding to the established contour standard for that type wheel. Upon completion of one wheel of a set of wheels on the same axle, the operation is repeated on the wheel on the opposite end of the axle using the truing mechanism for the opposite hand. After the truing operation is completed on a set of wheels on one axle, the entire operation is reversed and the locomotive is repositioned to place a new set of wheels to be trued on the removable rail sections.

Having described presently preferred embodiments of the invention it is to be understood that it may be otherwise embodied within the scope of the appended claims.

I claim:

1. In a method of truing metal wheels of railroad locomotives and other rolling stock having a traction motor for driving a locomotive wheel to be trued wherein the locomotive or other rolling stock is moved into position on rail sections extending over an open pit, the locomotive or other rolling stock is lifted from the rail sections and the rail sections are removed to provide access to the wheel to be trued from the pit, the improvement comprising the steps of:
   A. connecting an independent power source to the traction motor and thereby driving a wheel to be trued at a controlled speed with the traction motor;
   B. removing metal from said wheel as it is driven with a cutting tool mechanism provided in the pit; and
   C. controlling said mechanism in accordance with a pre-established pattern to cause the cutting tool to move across the driven wheel to remove metal to form a wheel contour corresponding to said pattern.

2. The improvement as set forth in claim 1 wherein said pattern is a template and the mechanism includes a stylus for following the template.

3. In an apparatus for truing metal wheels of railroad locomotives and other rolling stock having a traction motor for driving locomotive wheels to be trued wherein said apparatus is disposed in and about an open pit having removable rail sections extending thereover for supporting said locomotive or other rolling stock and including means for lifting said locomotive or other stock from the rails, the improvement comprising:
   A. means for removing said rail sections to provide access to said wheels from said pit;
   B. means for driving said wheels to be trued at a controlled speed through said traction motor independently of said locomotive or other rolling stock;
   C. means for cutting the metal from said wheels; and
   D. means for controlling said cutting means to cut said metal in a contour corresponding to a predetermined pattern.

4. The improvement as set forth in claim 3 wherein the means for removing the rail sections comprise hydraulic pistons for moving the sections laterally with respect to the balance of the rails.

5. The improvement as set forth in claim 3 wherein the driving means comprises silicon-controlled rectifier units.

6. The improvement as set forth in claim 5 wherein the locomotive is a diesel locomotive and the driving means is connected to said traction motor of the locomotive.

7. The improvement as set forth in claim 3 wherein the cutting means comprises a lathe cutting tool mounted on a cross slide.

8. The improvement as set forth in claim 7 wherein the controlling means comprises an automatic tracer control unit having a template, a stylus for following the template and means connecting the stylus and the cross slide for causing the cross slide to move in a path corresponding to the movement of the stylus with respect to the template.

9. The improvement as set forth in claim 3 wherein there are two sets of driving means, cutting means and controlling means, one set for truing one wheel and the other set for truing a second wheel on the same axle of a locomotive or other rolling stock.

10. Mechanism for truing the metal wheels of railroad locomotives and other rolling stock having a traction motor for driving a locomotive wheel to be trued wherein said mechanism is adapted to be positioned in an open pit beneath the wheels to be trued and including cutting means engageable with said metal wheels, said mechanism comprising:
   A. independent drive means for driving the wheel to be trued with the traction motor at a controlled speed;
   B. a cutting tool;
   C. means for supporting said cutting tool such that it is movable in the X and Y axes, said supporting means comprising:
      (1) a base;
      (2) a saddle movably mounted on the base;
      (3) a cross slide carrying the cutting tool and movably mounted on the saddle at right angles to said saddle; and
   D. means for controlling the movement of said cross slide in accordance with a predetermined pattern to cause the cutting tool carried thereon to remove metal from the wheel to establish a contour corresponding to said pattern.

11. Mechanism as set forth in claim 10 wherein the controlling means comprises an automatic tracer control unit having a template, a stylus for following the template and means connecting the stylus and the cross slide for cross slide for causing the slide to move in a path corresponding to the movement of the stylus with respect to the template.

12. Mechanism as set forth in claim 10 wherein said mechanism is so located in the pit that the cutting tool extends at an angle of approximately 30° with respect to a vertical plane which includes the central axis of the axle upon which the wheel to be trued is mounted, such that the tool can be moved into contact with the surface of the wheel without interference.

13. In an apparatus for truing metal wheels of railroad locomotives and other rolling stock having a traction motor for driving locomotive wheels to be trued wherein said apparatus is disposed in and about an open pit having removable rail sections extending thereover for supporting said locomotive or other rolling stock and including means for lifting said locomotive or other stock from the rails, the improvement comprising:
   A. means for laterally moving said rail sections to provide access to said wheels from the pit;
   B. means for driving said wheels to be trued through said traction motor at a controlled speed and independently of said locomotive or other rolling stock;

C. cutting means engageable with said metal wheels comprising a cutting tool, means for supporting said cutting tool such that it is movable in the X and Y axes, said supporting means including a base, a saddle mounted on the base, a cross slide carrying the cutting tool and movably mounted on the saddle at right angles thereto; and D. means for controlling the movement of said cross slide in accordance with a predetermined pattern to cause the cutting tool to remove metal from the wheel to establish a contour corresponding to said pattern.

14. The improvement as set forth in claim 13 wherein the controlling means comprises a tracer control unit for controlling the path of travel of the cross slide.

* * * * *